(12) United States Patent
Yamamoto et al.

(10) Patent No.: US 12,246,521 B2
(45) Date of Patent: Mar. 11, 2025

(54) FIBER-REINFORCED RESIN MATERIAL, METHOD FOR MANUFACTURING SAME, AND FIBER-REINFORCED RESIN ARTICLE

(71) Applicants: TOYOTA BOSHOKU KABUSHIKI KAISHA, Aichi-ken (JP); NATIONAL UNIVERSITY CORPORATION TOKAI NATIONAL HIGHER EDUCATION AND RESEARCH SYSTEM, Aichi-ken (JP)

(72) Inventors: Tetsuya Yamamoto, Aichi-ken (JP); Kohei Kira, Ehime-ken (JP); Keisuke Kato, Aichi-ken (JP); Masaaki Nomura, Aichi-ken (JP)

(73) Assignees: TOYOTA BOSHOKU KABUSHIKI KAISHA, Aichi-Ken (JP); NATIONAL UNIVERSITY CORPORATION TOKAI NATIONAL HIGHER EDUCATION AND RESEARCH SYSTEM, Aichi-Ken (JP)

( * ) Notice: Subject to any disclaimer, the term of this patent is extended or adjusted under 35 U.S.C. 154(b) by 186 days.

(21) Appl. No.: 17/813,239

(22) Filed: Jul. 18, 2022

(65) Prior Publication Data
US 2023/0044569 A1 Feb. 9, 2023

(30) Foreign Application Priority Data
Aug. 3, 2021 (JP) .................. 2021-127846

(51) Int. Cl.
*B32B 27/12* (2006.01)
*B29C 70/00* (2006.01)
(Continued)

(52) U.S. Cl.
CPC .......... *B32B 27/12* (2013.01); *B29C 70/0035* (2021.05); *B32B 5/02* (2013.01);
(Continued)

(58) Field of Classification Search
CPC ......... B32B 27/12; B32B 7/022; B32B 27/34; B32B 37/185; B32B 2260/023;
(Continued)

(56) References Cited

U.S. PATENT DOCUMENTS 4,732,803 A * 3/1988 Smith, Jr. ............. F41H 5/0464
428/113
9,493,642 B2 11/2016 Kito et al.
(Continued)

FOREIGN PATENT DOCUMENTS

JP 2005-289056 10/2005
JP 2013-147646 8/2013
(Continued)

OTHER PUBLICATIONS

"Modulus of elasticity and Poisson's coefficient of polymeric materials", 2003, Sonelastic, https://www.sonelastic.com/en/fundamentals/tables-of-materials-properties/polymers.html (Year: 2003).*
(Continued)

*Primary Examiner* — Jasper Saberi
(74) *Attorney, Agent, or Firm* — Greenblum & Bernstein, P.L.C.

(57) ABSTRACT

A fiber-reinforced resin material includes: a first fiber-reinforced resin layer; a second fiber-reinforced resin layer having higher ductility and lower elasticity than those of the first fiber-reinforced resin layer; and a third fiber-reinforced resin layer having higher ductility and lower elasticity than those of the second fiber-reinforced resin layer. The first layer, the second layer, and the third layer are laminated and integrated in this order, wherein the laminate is made of the fiber-reinforced resin material. The manufacturing method includes: stacking a sheet-shaped product obtained by forming continuous fibers into a sheet shape and a resin sheet that serves as a first thermoplastic resin, a second thermoplastic
(Continued)

resin, or a third thermoplastic resin so as to obtain a laminated structure in which the first layer, the second layer, and the third layer are laminated in this order; and heating and compressing the obtained stacked product in a stacking direction.

8 Claims, 5 Drawing Sheets

(51) Int. Cl.
  B32B 5/02 (2006.01)
  B32B 5/26 (2006.01)
  B32B 7/022 (2019.01)
  B32B 27/32 (2006.01)
  B32B 27/34 (2006.01)
  B32B 37/06 (2006.01)
  B32B 37/10 (2006.01)
  B32B 37/18 (2006.01)
(52) U.S. Cl.
  CPC ............... *B32B 5/26* (2013.01); *B32B 7/022* (2019.01); *B32B 27/32* (2013.01); *B32B 27/34* (2013.01); *B32B 37/06* (2013.01); *B32B 37/10* (2013.01); *B32B 37/185* (2013.01); *B32B 2250/03* (2013.01); *B32B 2250/20* (2013.01); *B32B 2255/02* (2013.01); *B32B 2255/26* (2013.01); *B32B 2260/023* (2013.01); *B32B 2260/046* (2013.01); *B32B 2262/106* (2013.01); *B32B 2264/0264* (2013.01); *B32B 2270/00* (2013.01); *B32B 2305/18* (2013.01); *B32B 2307/51* (2013.01); *B32B 2307/54* (2013.01); *B32B 2307/732* (2013.01); *B32B 2309/02* (2013.01); *B32B 2309/12* (2013.01); *B32B 2313/04* (2013.01); *B32B 2323/10* (2013.01); *B32B 2377/00* (2013.01); *B32B 2605/08* (2013.01)
(58) Field of Classification Search
  CPC .......... B32B 2260/046; B32B 2307/54; B32B 2250/00; B32B 5/26; B32B 2307/51; B32B 2250/03; B32B 27/32; B32B 2270/00; B29C 70/0035; B60R 19/03
  See application file for complete search history.

(56) References Cited

U.S. PATENT DOCUMENTS

| | | | |
|---|---|---|---|
| 9,840,615 B2 | 12/2017 | Kito et al. | |
| 2003/0104738 A1* | 6/2003 | Porter | B29C 66/721 |
| | | | 156/92 |
| 2014/0371394 A1* | 12/2014 | Kito | C08J 5/00 |
| | | | 525/184 |
| 2017/0029610 A1 | 2/2017 | Kito et al. | |
| 2019/0284380 A1* | 9/2019 | Kato | C08L 77/04 |
| 2020/0283589 A1 | 9/2020 | Geho et al. | |

FOREIGN PATENT DOCUMENTS

| | | |
|---|---|---|
| JP | 2017-082060 | 5/2017 |
| JP | 2018-123284 | 8/2018 |
| WO | 2017/150702 | 9/2017 |
| WO | 2018/021569 | 2/2018 |

OTHER PUBLICATIONS

Office Action issued in Japan Patent Appl. No. 2021-127846, dated Oct. 22, 2024, along with an English translation thereof.

* cited by examiner

US 12,246,521 B2

FIBER-REINFORCED RESIN MATERIAL, METHOD FOR MANUFACTURING SAME, AND FIBER-REINFORCED RESIN ARTICLE

CROSS REFERENCE TO RELATED APPLICATIONS

The present application claims priority under 35 USC § 119 to Japanese Patent Application No. 2021-127846 filed on Aug. 3, 2021, the disclosure of which is hereby expressly incorporated by reference in its entirety.

BACKGROUND OF THE INVENTION

(1) Field of the Invention

The present invention relates to a fiber-reinforced resin material, a method for manufacturing the same, and a fiber-reinforced resin article. More specifically, the present invention relates to a fiber-reinforced resin material using a thermoplastic resin, a method for manufacturing the same, and a fiber-reinforced resin article.

(2) Description of Related Art

Conventionally, a composite material referred to as a fiber-reinforced plastic or the like is known. In general, a fiber-reinforced plastic is obtained by coating a fiber assembly such as a glass fiber nonwoven fabric, as a core material, with a resin (matrix resin) as a matrix material, and then curing the resin. At this time, a thermosetting resin is often employed as the matrix resin. From the viewpoint that many thermosetting resins are excellent in fluidity in an uncured state, and easily impregnated into the core material, a thermosetting resin is selected. However, the thermosetting resin has a disadvantage that the thermosetting resin, when cured, becomes brittle and is easily cracked. Therefore, a fiber-reinforced resin material and a fiber-reinforced resin article that are harder to crack are demanded. From such a viewpoint, it is expected to employ a thermoplastic resin as a matrix resin.

From these viewpoints, thermoplastic resins described in JP 2013-147646 A and WO 2018 021569 A are known as thermoplastic resins excellent in impact resistance. In addition, the fiber-reinforced material described in JP 2018-123284 A is known as a fiber-reinforced material using a thermoplastic resin having excellent impact resistance as a matrix resin. Furthermore, techniques described in JP 2017-82060 A and WO 2017-150702 A are known as techniques for improving affinity between reinforcing fibers and a matrix resin.

JP 2013-147646 A discloses that a thermoplastic resin composition obtained by melt-kneading a polyamide resin, a polyolefin resin, and a compatibilizer can exhibit excellent impact resistance by employing therein a predetermined plant-derived polyamide resin as the polyamide resin.

WO 2018-021569 A discloses that a thermoplastic resin composition obtained by melt-kneading a polyamide resin, a polyolefin resin, and a compatibilizer can exhibit excellent impact resistance by employing therein a polyolefin resin in which Mn is 350,000 or more as the polyolefin resin and a polyamide resin having a structure in which a carbon number of a linear-chain part of a hydrocarbon group sandwiched between adjacent amide bonds in a main chain is 5 or less as the polyamide resin.

JP 2018-123284 A discloses that a fiber-reinforced material and a structure that are hardly cracked are obtained by employing a thermoplastic resin composition obtained by melt-kneading a polyamide resin, a polyolefin resin, and a compatibilizer as a matrix resin.

JP 2017-82060 A and WO 2017-150702 A disclose that interfacial adhesion with a thermoplastic resin can be improved by employing a carbon fiber having thermoplastic resin particles adsorbed on a surface thereof in a carbon fiber-reinforced plastic.

Although a fiber-reinforced material and a structure that are hardly cracked can be obtained by the technique of JP 2018-123284 A, a material having further excellent strength characteristics is demanded.

SUMMARY OF THE INVENTION

Embodiments of the present invention have been made in view of the above circumstances, and an object of the present invention is to provide a fiber-reinforced resin material that is harder to crack than before, a method for manufacturing the same, and a fiber-reinforced resin article that is harder to crack than before.

Specifically, the embodiments will be described below.

[1] A fiber-reinforced resin material, including:
a first fiber-reinforced resin layer;
a second fiber-reinforced resin layer having higher ductility and lower elasticity than those of the first fiber-reinforced resin layer; and
a third fiber-reinforced resin layer having higher ductility and lower elasticity than those of the second fiber-reinforced resin layer,
wherein the first fiber-reinforced resin layer, the second fiber-reinforced resin layer, and the third fiber-reinforced resin layer are laminated and integrated in this order.

[2] The fiber-reinforced resin material according to [1], wherein the first fiber-reinforced resin layer comprises a first thermoplastic resin and continuous fibers,
wherein the second fiber-reinforced resin layer comprises a second thermoplastic resin and continuous fibers,
wherein the third fiber-reinforced resin layer comprises a third thermoplastic resin and continuous fibers, and
wherein the first thermoplastic resin, the second thermoplastic resin, and the third thermoplastic resin are three kinds of thermoplastic resins different from each other.

[3] The fiber-reinforced resin material according to [2], wherein the first thermoplastic resin, the second thermoplastic resin, and the third thermoplastic resin are each selected from a thermoplastic resin A, a thermoplastic resin B, and a composite resin thereof.

[4] The fiber-reinforced resin material according to [3], wherein all of the continuous fibers have particles attached to surfaces thereof, and
wherein the particles are made of any of the thermoplastic resin A, the thermoplastic resin B, and the composite resin.

[5] The fiber-reinforced resin material according to [1], wherein the first fiber-reinforced resin layer, the second fiber-reinforced resin layer, and the third fiber-reinforced resin layer have different fiber content rates.

[6] A fiber-reinforced resin article made of the fiber-reinforced resin material according to [1].

[7] A method for manufacturing the fiber-reinforced resin material according to [2], the method including:
a stacking step of stacking a sheet-shaped product obtained by forming the continuous fibers into a sheet shape and each resin sheet that serves as the first thermoplastic resin, the second thermoplastic resin, or the third thermoplastic resin so as to obtain a laminated structure in which the first fiber-reinforced resin layer, the second fiber-reinforced resin layer, and the third fiber-reinforced resin layer are laminated in this order; and a hot-pressing step of heating and compressing a stacked product obtained through the stacking step in a stacking direction.

The fiber-reinforced resin material and fiber-reinforced resin article of the present embodiment can provide more excellent difficulty in cracking than that in conventional cases. In particular, it is possible to increase an amount of energy that can be absorbed before break.

The method for manufacturing a fiber-reinforced resin material of the present embodiment can provide a fiber-reinforced resin material and a fiber-reinforced resin article having more excellent difficulty in cracking than that in conventional cases. In particular, it is possible to obtain a fiber-reinforced resin material and a fiber-reinforced resin article having a large amount of energy that can be absorbed before break.

BRIEF DESCRIPTION OF THE DRAWINGS

The present invention will be further described in the following detailed description with reference to the following figures, given non-limiting examples of exemplary embodiments according to the present invention, and like reference symbols represent identical parts through several figures.

DETAILED DESCRIPTION OF PREFERRED EMBODIMENTS

Subjects shown herein are illustrative one and one for describing embodiments of the present invention exemplarily, and are described for providing one believed to be explanation in which the principles and conceptual characteristics of the invention can be understood most effectively and without any difficulty. In this regard, no attempt is made to show structural details of the present invention in more detail than is necessary for the fundamental understanding of the present invention, and the description is taken with the drawings making apparent to those skilled in the art how several forms of the present invention may be embodied in practice.

[1] Fiber-Reinforced Resin Material

A fiber-reinforced resin material (1) of the present embodiment includes:

a first fiber-reinforced resin layer (11);

a second fiber-reinforced resin layer (12) having higher ductility and lower elasticity than those of the first fiber-reinforced resin layer (11); and a third fiber-reinforced resin layer (13) having higher ductility and lower elasticity than those of the second fiber-reinforced resin layer (12).

Figure 1:
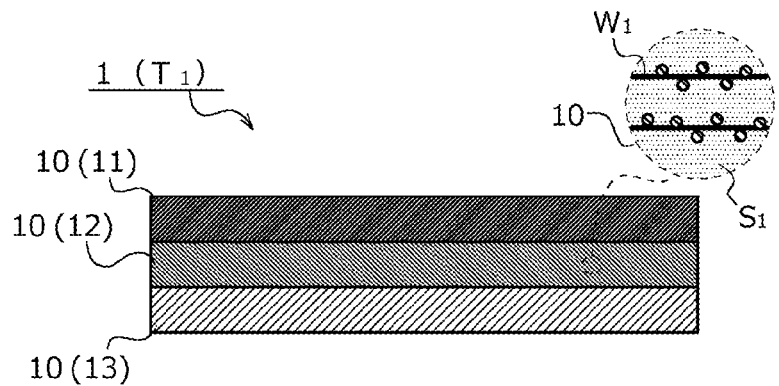
FIG. 1 is an explanatory view for explaining an example of a fiber-reinforced resin material.

The first fiber-reinforced resin layer (11), the second fiber-reinforced resin layer (12), and the third fiber-reinforced resin layer (13) are laminated and integrated in this order (see FIG. 1).

[1-1] Fiber-Reinforced Resin Layer

The first fiber-reinforced resin layer 11 (hereinafter, also simply referred to as "first layer"), the second fiber-reinforced resin layer 12 (hereinafter, also simply referred to as "second layer"), and the third fiber-reinforced resin layer 13 (hereinafter, also simply referred to as "third layer") described above are all fiber-reinforced resin layers 10 (see FIG. 1).

The fiber-reinforced resin layer 10 is a layer including reinforcing fibers $W_1$ and a binder resin $S_1$ that binds the reinforcing fibers to each other (see a partially enlarged view of FIG. 1).

The second layer 12 has higher ductility and lower elasticity than those of the first layer 11, and the third layer 13 has higher ductility and lower elasticity than those of the second layer 12. A difference among the first layer, the second layer, and the third layer is usually formed due to a difference in content (content rate) of the reinforcing fibers $W_1$ or in binder resin $S_1$.

[1-2] Reinforcing Fiber

The reinforcing fibers $W_1$ (see FIGS. 1 and 6) may be discontinuous fibers, continuous fibers, or a combination thereof. In the present embodiment, it is preferable that the reinforcing fibers $W_1$ be composed of continuous fibers alone or composed mainly of continuous fibers (50 mass % or more and less than 100 mass % of the entire fibers). By using continuous fibers, mechanical strength of the fiber-reinforced resin layer 10 can be improved.

A fiber length of the reinforcing fibers $W_1$ is not limited, and can be 15 mm or more. When the fiber length is 15 mm or more, intersection between the reinforcing fibers can be increased, so that strength of a fiber assembly which will be described below can be increased. Furthermore, the fiber length is preferably 50 mm or more, more preferably 100 mm or more, further preferably 500 mm or more. A maximum fiber length is not limited. For example, a structure made of the present fiber-reinforced resin material can contain fibers continuous in series from one end to the other end thereof. In this case, the maximum fiber length can be, for example, $1 \times 10^6$ mm or less.

That is, the reinforcing fibers $W_1$ may be discontinuous fibers, continuous fibers, or a combination thereof. However, in the present embodiment, it is preferable that the reinforcing fibers $W_1$ be composed of continuous fibers alone or composed mainly of continuous fibers (50 mass % or more and 100 mass % of the entire fibers). By using continuous fibers, mechanical strength of the fiber-reinforced resin layer 10 can be improved.

Therefore, the discontinuous fibers can be fibers (short fibers or the like) chopped into less than 15 mm. On the other hand, the continuous fibers can be fibers chopped into 15 mm or more (long fibers or the like), fibers chopped into 50 mm or more (long fibers or the like), fibers chopped into 100 mm or more (long fibers or the like), fibers chopped into 500 mm or more (long fibers or the like), further, fibers that are not substantially chopped, or the like.

A material constituting the reinforcing fibers $W_1$ is not limited. An inorganic material may be used, an organic material may be used, or these materials may be used in combination.

Examples of the inorganic fibers include carbon fibers, activated carbon fibers, glass fibers, ceramic fibers (silicate, titanate, alumina, and the like), metal fibers, and boron fibers. These may be used singly, or two or more thereof may be used in combination.

Examples of the organic fibers include natural fibers and synthetic fibers. These may be used singly, or two or more thereof may be used in combination. Among them, fibers obtained by shaping a synthetic resin into a fiber shape are taken as an example of the synthetic fibers. Examples of such synthetic resin fibers include polyamide resin fibers (such as aliphatic polyamide (e.g., nylon fibers) and aromatic polyamide (e.g., aramid fibers, trade name "KEVLAR")), polyester resin fibers (such as aliphatic polyester and aromatic polyester (e.g., polyethylene terephthalate fibers and polyethylene naphthalate fibers)), polyolefin resin fibers (such as high molecular weight polyolefins (e.g., trade name "DYNEEMA")), and polybenzazole resin fibers (such as polyparaphenylene benzobisoxazole fibers (e.g., trade name "ZYLON")).

The reinforcing fibers $W_1$ are preferably fibers having a higher tensile strength, and, for example, fibers having a tensile strength of 7 cN/dtex or more (usually, 50 cN/dtex) in accordance with JIS L 1015 are preferred.

Furthermore, a form of the fibers is not limited, and may be a spun yarn, a filament yarn, or a combination thereof. Further, a monofilament may be used, a multifilament may be used, or these filaments may be used in combination.

The present fiber-reinforced resin material utilizes carbon fibers, especially among the above materials, as the reinforcing fibers $W_1$ and thus can exhibit particularly excellent performance.

A type of carbon fibers is not limited, and examples thereof include polyacrylonitrile (PAN)-based carbon fibers and pitch-based carbon fibers. These may be used singly, or two or more thereof may be used in combination.

When carbon fibers are selected as the reinforcing fibers $W_1$, and, further, the carbon fibers are bundled and used, the number of carbon fibers constituting a carbon fiber bundle (tow) is not limited, and can be, for example, 1000 or more. The number of carbon fibers can be, for example, 1,000 or more and 50,000 or less, further 1,500 or more and 40,000 or less, and further 2,000 or more and 30,000 or less.

A thickness of the carbon fibers is not limited, and, for example, an average diameter can be 1,000 nm or more and 30,000 nm or less, and further 1,000 nm or more and 10,000 nm or less.

A sizing agent may be attached to surfaces of the carbon fibers, but it is preferable that no sizing agent be attached, from the viewpoint of improving the attachability of particles which will be described below (thermoplastic resin particles). When a sizing agent is attached to the surfaces of the carbon fibers, the sizing agent is preferably removed using a sizing remover (for example, acetone, 2-butanone (methyl ethyl ketone), tetrahydrofuran, dichloromethane, or dichloroethane).

[1-3] Attached Particle

Figure 6:
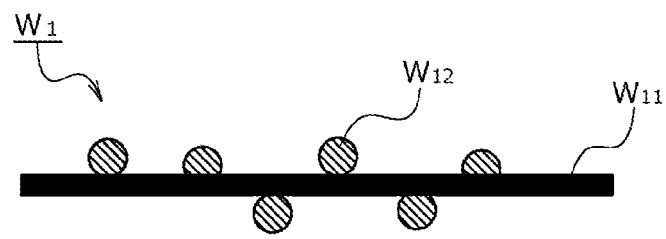
FIG. 6 is an explanatory view showing an example of continuous fibers.

The reinforcing fibers $W_1$ can have particles $W_{12}$ attached to surfaces of fibers $W_{11}$ (see FIG. 6). When the reinforcing fibers $W_1$ have the particles $W_{12}$ attached to the fiber surfaces, the binder resin $S_1$ can easily enter a space between the reinforcing fibers $W_1$, so that the mechanical strength of the fiber-reinforced resin material can be improved. In particular, when the particles $W_{12}$ made of a material having affinity with a resin component constituting the binder resin $S_1$ are used as the particles $W_{12}$, adhesion between the reinforcing fibers $W_1$ and the binder resin $S_1$ can be strengthened, and a fracture origin between these different materials can be reduced. In particular, when the binder resin $S_1$ is a thermoplastic resin, the action thereof can be more remarkably obtained. That is, since the thermoplastic resin has an excellent elongation as compared with that of a curable resin, it is considered that, when the thermoplastic resin is used as the binder resin $S_1$, toughness can be imparted to the fiber-reinforced resin material. On the other hand, when the thermoplastic resin having an excellent elongation is used as the binder resin $S_1$, the binder resin $S_1$ may have an elongation higher than that of the reinforcing fibers $W_1$. However, the presence of the particles $W_{12}$ described above can result in more effective reduction in interface separation between the reinforcing fiber $W_1$ and the binder resin $S_1$, so that the high elongation property due to the use of the thermoplastic resin can be more highly utilized.

The material constituting the particles $W_{12}$ attached to the reinforcing fibers $W_1$ is not limited. However, when the material for the particles $W_{12}$ is a thermoplastic resin, as in the case of the binder resin $S_1$ as described above, an excellent effect can be obtained. Therefore, the material constituting the particles is preferably a thermoplastic resin, as in the case of the binder resin $S_1$. As the thermoplastic resin, various thermoplastic resins exemplified as resins constituting the binder resin $S_1$, which will be described later, can be used.

Furthermore, from the viewpoint that the binder resin $S_1$ and the material constituting the particles $W_{12}$ preferably have higher affinity, it is preferable that the thermoplastic resin constituting the particles $W_{12}$ and the thermoplastic resin constituting the binder resin $S_1$ be the same kind of thermoplastic resin or contain the same kind of thermoplastic resin as a component resin. Examples of a case where they are the same kind of thermoplastic resin include cases where they are polyamides, polyolefins, polyesters, and the like. Examples of a case where they contain the same kind of resin as a component resin include a case where the binder resin $S_1$ is a melt-kneaded product of a polyolefin, a polyamide, and a compatibilizer therefor, and the thermoplastic resin constituting the particles contains a polyolefin and/or a polyamide.

Attachment of the particles $W_{12}$ to the reinforcing fibers $W_1$ may be performed by any method. For example, when the reinforcing fibers $W_1$ are electrically conductive fibers, particularly carbon fibers, the attachment can be performed using the disclosure of JP 2017-82060 A and the disclosure of WO 2017-150702 A. That is, for example, while the reinforcing fibers $W_1$ are immersed in (1) a colloidal solution containing particles, a nonionic surfactant, an electrolyte, and water, or (2) a colloidal solution containing particles, a radical polymerization initiator, and water, a voltage is applied to the reinforcing fibers $W_1$ as a positive electrode or a negative electrode to perform electrophoresis, whereby the particles $W_{12}$ can be attached to the reinforcing fibers $W_1$.

A size of the particles $W_{12}$ is not limited, but an average particle diameter can be, for example, 0.02 µm or more and 0.5 µm or less. Further, from the viewpoint of improving an adsorption property to the reinforcing fibers $W_1$, the average particle diameter can be 0.02 µm or more and 5 µm or less, 0.02 µm or more and 1 µm or less, or 0.02 µm or more and 0.5 µm or less.

The particles $W_{12}$ can be attached to, for example, 30 to 100 area %, or further 60 to 99 area % of the surfaces of the reinforcing fibers.

The average particle diameter of the particles $W_{12}$ can be measured by scanning electron microscope observation. More specifically, in a still image enlarged using a scanning electron microscope, maximum diameters of arbitrary 20 particles attached to the reinforcing fibers $W_1$ are actually measured, and an average value thereof can be taken as the average particle diameter.

[1-4] Fiber Assembly

The state of the reinforcing fibers $W_1$ in the fiber-reinforced resin layer 10 is not limited, but the reinforcing fibers $W_1$ are usually contained as an assembled fiber assembly (fiber assembly layer).

Examples of the fiber assembly when the reinforcing fibers $W_1$ are discontinuous fibers include nonwoven fabrics on which discontinuous fibers are deposited.

Examples of the fiber assembly when the reinforcing fibers $W_1$ are continuous fibers include a fiber assembly in which continuous fibers are aligned, a fiber assembly in which tows obtained by bundling continuous fibers are aligned, a fiber assembly obtained by weaving continuous fibers (woven fabric using continuous fibers), and a fiber assembly obtained by weaving tows obtained by bundling continuous fibers (woven fabric using tows). These may be used singly, or two or more thereof may be used in combination.

The fiber assembly may contain discontinuous fibers in addition to continuous fibers even if the fiber assembly uses continuous fibers. When the fiber assembly contains discontinuous fibers, a content of the discontinuous fibers is not limited, but is preferably less than 50 mass %, more preferably 25 mass % or less, particularly preferably 5 mass % or less when a total amount of fibers constituting the fiber assembly is 100 mass %.

The fiber assembly used may consist of a single layer, but may be composed of a plurality of layers. When the fiber assembly is layered, a layer thickness thereof is not limited, and can be, for example, 0.01 µm or more and 5000 µm or less, 0.1 µm or more and 1000 µm or less, 1 µm or more and 500 µm or less, or 5 µm or more and 250 µm or less. A basis weight of the fiber assembly is not limited, and may be, for example, 0.1 g/m² or more and 100,000 g/m² or less.

The layer thickness of the fiber assembly can be measured by scanning electron microscope observation. More specifically, in a still image obtained by enlarging a cross section of the fiber-reinforced resin material in a stacking direction, thicknesses at 10 arbitrary positions are actually measured, and an average value thereof can be taken as the layer thickness.

[1-5] Binder Resin

The binder resin $S_1$ is a resin (matrix resin) that binds the reinforcing fibers to each other. The binder resin $S_1$ may be a curable resin (curing with heat, energy rays, or the like), a thermoplastic resin, or a combination thereof, and, among them, a thermoplastic resin is preferred. In addition, the binder resin $S_1$ may consist only of a resin component, but can contain other components such as a filler (non-resin component and the like) in addition to the resin component (in this case, it can be referred to as binder resin composition). Other components will be described later.

A type of the thermoplastic resin is not limited, and examples thereof include polyamides, polyolefins, polyesters, polycarbonates, acrylic resins, fluorine-containing thermoplastic resins, polyimides, polyamideimides, and resin alloys (composite resins) containing two or more of these thermoplastic resins. These may be used singly, or two or more thereof may be used in combination.

Among the above-described ones, the type of polyamides (hereinafter, sometimes simply abbreviated as "PA") is not limited, and examples thereof include PA6, PA66, PA11, PA610, PA612, PA614, PA12, PA6T, PA6I, PAST, PAMST, PA1010, PA1012, PA10T, PAMXD6, PA6T/66, PA6T/6I, PA6T/6I/66, PA6T/2M-5T, and PAST/2M-8T. These polyamides may be used singly, or two or more thereof may be used in combination.

In this fiber-reinforced resin material, PA6, PA66, and the like can be selected from among the polyamides described above, from the viewpoint of versatility, impact resistance, processability, and the like. These may be used singly, or two or more thereof may be used in combination. From the viewpoint of environmental properties (carbon neutral) and sustainability, plant-derived polyamides (polyamides using plant-derived monomers) can be selected from among the polyamides described above. Examples of the plant-derived polyamides include PA11, PA610, PA612, PA614, PA1010, PA1012, and PA10T. These may be used singly, or two or more thereof may be used in combination.

A molecular weight of the polyamide is not limited, and can be, for example, 5,000 or more and 100,000 or less, preferably 7,500 or more and 50,000 or less, and more preferably 10,000 or more and 50,000 or less. This molecular weight is a weight average molecular weight on the polystyrene equivalent basis by gel permeation chromatography (GPC).

Among the above-described ones, the type of polyolefins (hereinafter, sometimes simply abbreviated as "PO") is not limited, and PO includes an olefin homopolymer and/or an olefin copolymer. The olefin constituting PO is not particularly limited, and examples thereof include ethylene, propylene, 1-butene, 3-methyl-1-butene, 1-pentene, 3-methyl-1-pentene, 4-methyl-1-pentene, 1-hexene, and 1-octene. These may be used singly, or two or more thereof may be used in combination. That is, examples of the polyolefins include polyethylene, polypropylene, poly(1-butene), poly(1-hexene), and poly(4-methyl-1-pentene). These polymers may be used singly, or two or more thereof may be used in combination.

Among the above polyolefins, the polyethylene includes an ethylene homopolymer and a copolymer of ethylene and another olefin. Among them, an ethylene-1-butene copolymer, an ethylene-1-hexene copolymer, an ethylene-1-octene copolymer, an ethylene-4-methyl-1-pentene copolymer, and the like are exemplified (50% or more of a total number of constitutional units is derived from ethylene).

Examples of the polypropylene include a propylene homopolymer and a copolymer of propylene and another olefin. Among them, examples of another olefin constituting the copolymer of propylene and another olefin include the above-described various olefins (excluding propylene). Further, the copolymer of propylene and another olefin may be a random copolymer or a block copolymer. In addition, in the copolymer of propylene and another olefin, 50% or more of the total number of constituent units is derived from propylene.

PO referred to herein is a PO having no affinity for PA and having no reactive group capable of reacting with PA. It is different from the compatibilizer for PA and PO in this respect.

Furthermore, the molecular weight of PO is not limited, and can be, for example, 10,000 or more and 700,000 or less, 100,000 or more and 600,000 or less, or 200,000 or more and 550,000 or less.

This molecular weight is a weight average molecular weight on the polystyrene equivalent basis by gel permeation chromatography (GPC). When a homopolymer is used as the polyolefin, values of weight average molecular weight can each be read as values of number average molecular weight.

For example, polyethylene terephthalate and polybutylene terephthalate are exemplified as the polyester, among the above-described thermoplastic resins. These may be used singly, or two or more thereof may be used in combination. For example, PMMA, ABS, and AS are exemplified as the acrylic resin, among the above-described thermoplastic resins. These may be used singly, or two or more thereof may be used in combination. For example, polytetrafluoroethylene is exemplified as the fluorine-containing thermoplastic resin among the above-described thermoplastic resins. These may be used singly, or two or more thereof may be used in combination.

Among the above-described thermoplastic resins, the resin alloy containing two or more thermoplastic resins is not limited, and may contain any combination of thermoplastic resins. However, a composite resin (thermoplastic resin) containing a polyamide and a polyolefin can be selected from the viewpoint of impact resistance, elongation, and processability. As the composite resin containing a polyamide and a polyolefin, (1) the composite resin disclosed in JP 2013-147646 A, (2) the composite resin disclosed in WO 2018-021569 A, and (3) the composite resin disclosed in JP 2018-123284 A can be used.

More specifically, (1) the composite resin disclosed in JP 2013-147646 A is a thermoplastic resin obtained by melt-kneading a polyamide resin, a polyolefin resin, and a compatibilizer, in which the polyamide resin is at least one plant-derived polyamide resin of PA11, PA610, PA614, PA1010, and PA10T, the compatibilizer is an acid-modified olefinic thermoplastic elastomer, a content of the polyamide resin is 1 mass % or more and 80 mass % or less, a content of the polyolefin resin is 5 mass % or more and 75 mass % or less, and a content of the compatibilizer is 1 mass % or more and 30 mass % or less with respect to 100 mass % of a total content of the polyamide resin, the polyolefin resin, and the compatibilizer.

(2) The composite resin disclosed in WO 2018-021569 A is a thermoplastic resin composition obtained by blending a polyolefin resin, a polyamide resin, and a modified elastomer having a reactive group that reacts with the polyamide resin (that is, a compatibilizer), in which the polyolefin resin has a number average molecular weight of 350,000 or more, and the polyamide resin has a structure in which a carbon number of a linear-chain part of a hydrocarbon group sandwiched between adjacent amide bonds in a main chain is 5 or less.

Furthermore, (3) the composite resin disclosed in JP 2018-123284 A is a thermoplastic resin obtained by blending a polyolefin resin, a polyamide resin, and a modified elastomer (compatibilizer) having a reactive group that reacts with the polyamide resin.

As the polyamide used in these composite resins, the above-described polyamide can be used. As the polyolefin used in these composite resins, the above-described polyolefin can be used. Furthermore, as the compatibilizer used in these composite resins, a compatibilizer which will be described below can be used.

The compatibilizer is a modified elastomer having a reactive group that reacts with the polyamide resin. The modified elastomer is preferably an elastomer further exhibiting affinity for the polyamide by utilizing the reactive group as described above and simultaneously exhibiting affinity for the polyolefin. That is, the modified elastomer is preferably a compatibilizer having a reactive group that reacts with the polyamide and having compatibility with both the polyolefin and the polyamide.

In the composite resins, the modified elastomer may be contained as an unreacted modified elastomer, may be contained as a reactant with the polyamide, or may be contained in both forms.

Examples of the reactive group of the compatibilizer include an acid anhydride group (—CO—O—OC—), a carboxyl group (—COOH), an epoxy group {—C2O (a three-membered ring structure composed of two carbon atoms and one oxygen atom)}, an oxazoline group (—C3H4NO), and an isocyanate group (—NCO). These may be used singly, or two or more thereof may be used in combination.

The reactive group can be introduced by modification to an elastomer before modification (unmodified elastomer). Specific examples thereof include an acid-modified elastomer, an epoxy-modified elastomer, and an oxazoline-modified elastomer. Among these, acid-modified products of elastomers are preferred, and modified products of elastomers with acid anhydrides or carboxylic acids are more preferred.

It is particularly preferred that the modified elastomer has an acid anhydride group or a carboxyl group at the side chain or terminal of the molecule. An amount of the acid modification amount is not particularly limited and, for example, the number of acid anhydride groups or carboxyl groups contained in one molecule of the modified elastomer is preferably 1 or more, more preferably 2 or more and 50 or less, still more preferably 3 or more and 30 or less, and particularly preferably 5 or more and 20 or less.

These modified elastomers may be used singly, or two or more thereof may be used in combination.

Examples of the elastomer before modification include an olefinic elastomer and a styrenic elastomer. From the viewpoint of compatibility with the polyolefin, an olefinic elastomer is particularly preferable.

The olefinic elastomer is preferably an α-olefin copolymer containing a structural unit derived from an α-olefin having 3 to 8 carbon atoms, and an ethylene-α-olefin copolymer, an α-olefin copolymer, an α-olefin-nonconjugated diene copolymer, and an ethylene-α-olefin-nonconjugated diene copolymer may be used. Of these, an ethylene-α-olefin copolymer, an α-olefin copolymer, and an ethylene-α-olefin-nonconjugated diene copolymer are particularly preferable.

Examples of the non-conjugated diene include: linear noncyclic diene compounds such as 1,4-pentadiene, 1,4-hexadiene, 1,5-hexadiene, and 1,6-hexadiene; branched chain noncyclic diene compounds such as 5-methyl-1,4-hexadiene, 3,7-dimethyl-1,6-octadiene, 5,7-dimethylocta-1, 6-diene, 3,7-dimethyl-1,7-octadiene, 7-methyl octa-1,6-diene, and dihydromyrcene; and alicyclic diene compounds such as tetrahydroindene, methyltetrahydroindene, dicyclopentadiene, bicyclo[2.2.1]hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Specific examples of the olefin elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Of these copolymers, an ethylene-propylene copolymer, an ethylene-1-butene copolymer, and an ethylene-1-octene copolymer are preferred.

Examples of the styrenic elastomer (namely, a styrenic thermoplastic elastomer having a styrene skeleton) include a block copolymer of an aromatic vinyl compound and a conjugated diene compound and a hydrogenated product thereof.

Examples of the aromatic vinyl compound include: alkylstyrenes such as styrene, α-methylstyrene, p-methylstyrene, and p-tert-butylstyrene; p-methoxystyrene, and vinylnaphthalene.

Examples of the conjugated diene compound include butadiene, isoprene, 1,3-pentadiene, methylpentadiene, phenylbutadiene, 3,4-dimethyl-1,3-hexadiene, and 4,5-diethyl-1,3-octadiene.

Specific examples of the styrenic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS).

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride, and butenyl succinic anhydride. Of these, maleic anhydride, phthalic anhydride, and itaconic anhydride are preferred.

Examples of the carboxylic acid include acrylic acid, methacrylic acid, maleic acid, fumaric acid, itaconic acid, and citraconic acid.

Among the above-described various modified elastomers, the compatibilizer in the composite resin is preferably an acid anhydride-modified elastomer, particularly preferably a maleic anhydride-modified elastomer, and further preferably an acid-modified product of an α-olefin copolymer containing a structural unit derived from α-olefin having 3 to 8 carbon atoms. Specifically, the compatibilizer is preferably an olefinic thermoplastic elastomer having a copolymer of ethylene or propylene and an α-olefin having 3 to 8 carbon atoms as a skeleton. More specifically the compatibilizer is preferably an elastomer modified with maleic anhydride, such as a maleic anhydride-modified ethylene-propylene copolymer, a maleic anhydride-modified ethylene-1-butene copolymer, a maleic anhydride-modified ethylene-1-hexene copolymer, and a maleic anhydride-modified ethylene-1-octene copolymer. Specifically, α-olefin copolymer "TAFMER series" (trade name) manufactured by Mitsui Chemicals, Inc., "AMPLIFY series" (trade name) manufactured by Dow Chemical Company, or the like can be used.

A molecular weight of the modified elastomer is not limited, and can be, for example, 10,000 or more and 500,000 or less, and is preferably 20,000 or more and 500,000 or less, and more preferably 30,000 or more and 300,000 or less.

The molecular weight of the modified elastomer is a weight average molecular weight on the polystyrene equivalent basis by gel permeation chromatography (GPC).

The binder resin $S_1$ can contain other components as necessary in addition to the thermoplastic resin described above. Examples of other components include various additives. Examples of the additives include nucleating agents, reinforcing fillers, antioxidants, heat stabilizers, weathering agents, light stabilizers, plasticizers, ultraviolet absorbers, antistatic agents, flame retardants, flame retardant promoters, slip agents, antiblocking agents, anti-fogging agents, lubricants, pigments, dyes, dispersants, copper inhibitors, neutralizers, foam inhibitors, weld strength improvers, natural oil, synthetic oil, and wax. These may be used singly, or two or more thereof may be used in combination.

Examples of the nucleating agents and reinforcing fillers include: silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as charcoal and bamboo charcoal; titanates such as potassium titanate and barium titanate; celluloses such as cellulose microfibril and cellulose acetate; and carbons such as fullerene.

Examples of the antioxidants include phenolic compounds, organic phosphite-based compounds, and thioether-based compounds.

Examples of the heat stabilizers include hindered amine-based compounds.

Examples of the ultraviolet absorbers include benzophenone-based compounds, benzotriazole-based compounds, and benzoate-based compounds.

Examples of the antistatic agents include nonionic compounds, cationic compounds, and anionic compounds.

Examples of the flame retardants include halogen-based compounds, phosphorus-based compounds (such as nitrogen-containing phosphate compounds and phosphoric acid esters), nitrogen-based compounds (such as guanidine, triazine, melamine, or derivatives thereof), inorganic compounds (such as metal hydroxides), boron-based compounds, silicone-based compounds, sulfur-based compounds, and red phosphorus-based compounds.

Examples of flame retardant promoters include antimony compounds, zinc compounds, bismuth compounds, magnesium hydroxide, and clayey silicates.

[1-6] First Layer, Second Layer, and Third Layer

The first layer 11, the second layer 12, and the third layer 13 have the following specific correlation. The correlation is such that the second layer 12 has higher ductility and lower elasticity than those of the first layer 11, and that the third layer 13 has higher ductility and lower elasticity than those of the second layer 12.

In the fiber-reinforced resin material in which the first layer 11, the second layer 12, and the third layer 13 are laminated and integrated in this order with this correlation, excellent difficulty in cracking can be obtained as compared with a fiber-reinforced resin material not having this configuration. In particular, it is possible to increase an amount of energy that can be absorbed before break.

In particular, in the fiber-reinforced resin material having the above configuration, when an impact is input from the first layer side toward the third layer side, remarkably excellent difficulty in cracking can be obtained. The reason for this can be considered as follows. In general, the fiber-reinforced resin material has a trade-off in which the fracture strain decreases as the strength (elastic modulus) increases. That is, deformation hardly occurs in a fiber-reinforced resin material having high strength, and thus, even when an impact is input, the fiber-reinforced resin material transitions with a small strain. When reaching the strength limit, the fiber-reinforced resin material itself is cracked.

On the other hand, the fiber-reinforced resin material of the present embodiment can have a large fracture strain while having high strength. Therefore, upon input of an impact, each of the fiber-reinforced resin layers withstands up to their individual strength, and is individually fractured when reaching the strength limit. Specifically, the first layer having the highest strength is fractured, but the other layers have higher ductility than that of the first layer and are not fractured. Therefore, the entire fiber-reinforced resin material is not fractured at once and is not cracked.

Further, even if the first layer is fractured, the first layer is laminated and integrated with the other layers, and thus interlaminar fracture with the second layer will be suppressed, so that a stress concentration point in the first layer will move and a plurality of fractures will occur in the first layer. On the other hand, the second layer to the third layer have ductility higher than that of the first layer, and thus function as toughness and can be strained. For this reason, the entire fiber-reinforced resin material is not cracked at once, and the fracture can gradually progress toward the third layer side while the break in each layer progresses. Therefore, it is considered that each layer can receive an impact with strain while the fracture progresses in each layer. That is, as a result, the present fiber-reinforced resin material can have higher fracture strain than that in conventional cases while having high strength, and can serve as a material in which the trade-off described above is suppressed.

The correlation, as described above, such that the second layer is higher in ductility and lower in elasticity than the first layer and the third layer is higher in ductility and lower in elasticity than the second layer, may be formed in any manner, and can be formed due to a difference in binder resin $S_1$ and/or a difference in content (content rate) of the reinforcing fibers $W_1$. Specifically, when the first layer 11 contains the first thermoplastic resin and the continuous fibers, the second layer 12 contains the second thermoplastic resin and the continuous fibers, and the third layer 13 contains the third thermoplastic resin and the continuous fibers, the first thermoplastic resin, the second thermoplastic resin, and the third thermoplastic resin are three kinds of thermoplastic resins different from each other, whereby the correlation can be attained. That is, the correlation can be realized by selecting a thermoplastic resin having higher ductility (higher elongation) than that of the first thermoplastic resin (hereinafter, also simply referred to as "first resin") as the second thermoplastic resin (hereinafter, also simply referred to as "second resin"), and further selecting a thermoplastic resin having higher ductility (higher elongation) than that of the second resin as the third thermoplastic resin (hereinafter, also simply referred to as "third resin").

Furthermore, at this time, the first resin, the second resin, and the third resin are each a thermoplastic resin selected from a thermoplastic resin A, a thermoplastic resin B, and a composite resin thereof, whereby bondability of each of the first layer, the second layer, and the third layer can be maintained high. For this reason, it is possible to suppress fracture between the respective layers and to cause active movement of the stress concentration point.

At this time, for example, (1) the thermoplastic resin A can be used as the first resin, the composite resin can be used as the second resin, and the thermoplastic resin B can be used as the third resin.

Further, for example, (2) the thermoplastic resin A can be used as the first resin, a first composite resin can be used as the second resin, and a second composite resin can be used as the third resin. In this case, the first composite resin and the second composite resin can be resins having different blending proportions of the thermoplastic resins A and B.

Further, for example, (3) the first composite resin can be used as the first resin, the second composite resin can be used as the second resin, and a third composite resin can be used as the third resin. In this case, the first composite resin, the second composite resin and the third composite resin can be resins having different blending proportions of the thermoplastic resins A and B.

More specifically, a polyamide can be selected as the thermoplastic resin A, and a polyolefin can be selected as the thermoplastic resin B. As a result, the thermoplastic resin having a higher polyamide proportion can form a fiber-reinforced resin layer having lower ductility and higher elasticity. On the other hand, the thermoplastic resin having a higher polyolefin proportion can form a fiber-reinforced resin layer having higher ductility and lower elasticity. Therefore, by using the polyamide and the polyolefin in different blending ratios, it is possible to form different three fiber-reinforced resin layers having affinity with each other and excellent bonding strength while having three types of different ductility and elasticity. As described above, a compatibilizer can be used to improve compatibility between the thermoplastic resin A and the thermoplastic resin B.

More specifically, when a plant-derived polyamide is selected as the thermoplastic resin A and a polyolefin (furthermore, polypropylene) is selected as the thermoplastic resin B, a composite resin of a melt-kneaded product of a plant-derived polyamide and a compatibilizer (particularly, an acid-modified olefin-based elastomer) and a polyolefin, which has a phase structure containing the polyolefin as a parent phase, can be selected as the composite resin. In this composite resin, when a total amount of the plant-derived polyamide, the polyolefin, and the compatibilizer is 100 mass %, the plant-derived polyamide can be used in an amount of 10 mass % or more and 40 mass % or less (further 15 mass % or more and 35 mass % or less), the polyolefin can be used in an amount of 40 mass % or more and 75 mass % or less (further 45 mass % or more and 70 mass % or less), and the compatibilizer can be used in an amount of 5 mass % or more and 35 mass % or less (further 10 mass % or more and 30 mass % or less).

When polyamide 6 is selected as the thermoplastic resin A and a polyolefin (furthermore, polypropylene) is selected as the thermoplastic resin B, a composite resin of a melt-kneaded product of polyamide 6 and a compatibilizer (particularly, an acid-modified olefin-based elastomer) and a polyolefin having a number average molecular weight of 350,000 or more (further, 450,000 or more) can be selected as the composite resin. In this composite resin, when a total amount of the polyamide 6, the polyolefin, and the compatibilizer is 100 mass %, the polyamide 6 can be used in an amount of 15 mass % or more and 65 mass % or less (further 35 mass % or more and 55 mass % or less), the polyolefin can be used in an amount of 15 mass % or more and 65 mass % or less (further 20 mass % or more and 45 mass % or less), and the compatibilizer can be used in an amount of 5 mass % or more and 35 mass % or less (further 10 mass % or more and 30 mass % or less).

Similarly, when a polyamide (plant-derived polyamide, polyamide 6 or the like) is selected as the thermoplastic resin A and a polyolefin (furthermore, polypropylene) is selected as the thermoplastic resin B, a composite resin of a melt-kneaded product of a polyamide and a compatibilizer (particularly, an acid-modified olefin-based elastomer) and a polyolefin, which has a co-continuous phase structure in which both a phase containing the polyamide as a parent phase and a phase containing the polyolefin as a parent phase are present, can be selected as the composite resin. In this composite resin, when a total amount of the polyamide, the polyolefin, and the compatibilizer is 100 mass %, the polyamide can be used in an amount of 15 mass % or more and 70 mass % or less (further 35 mass % or more and 65 mass % or less), the polyolefin can be used in an amount of 15 mass % or more and 65 mass % or less (further 20 mass % or more and 50 mass % or less), and the compatibilizer can be used in an amount of 5 mass % or more and 35 mass % or less (further 7 mass % or more and 30 mass % or less).

As described above, when the reinforcing fibers $W_1$ have the particles $W_{12}$ attached to the surfaces thereof, it is preferable to select any thermoplastic resin among the thermoplastic resin A, the thermoplastic resin B, and the composite resin as the material constituting the particles $W_{12}$.

Specifically, (1) when the thermoplastic resin A is used as the first resin, the composite resin is used as the second resin, and the thermoplastic resin B is used as the third resin, the thermoplastic resin A or the composite resin can be used for the particles attached to the continuous fibers forming the first layer. Similarly, the thermoplastic resin A, the thermoplastic resin B or the composite resin can be used for the particles attached to the continuous fibers forming the second layer. Similarly, the thermoplastic resin B or the composite resin can be used for the particles attached to the continuous fibers forming the third layer.

Also, (2) when the thermoplastic resin A is used as the first resin, the first composite resin is used as the second resin, and the second composite resin is used as the third resin, the thermoplastic resin A or the composite resin can be used for the particles attached to the continuous fibers forming the first layer. Similarly, the thermoplastic resin A, the thermoplastic resin B or the composite resin can be used for the particles attached to the continuous fibers forming the second layer. Similarly, the thermoplastic resin A, the thermoplastic resin B or the composite resin can be used for the particles attached to the continuous fibers forming the third layer.

Further, (3) when composite resins different from each other are used as all of the first resin to the third resin, the thermoplastic resin A, the thermoplastic resin B, or the composite resin can be used for the particles attached to the continuous fibers forming each of the first layer to the third layer.

The correlation that the second layer is higher in ductility and lower in elasticity than the first layer and that the third layer is higher in ductility and lower in elasticity than the second layer can be formed using the first layer, the second layer, and the third layer different in fiber content rate of the reinforcing fibers $W_1$. Specifically, a layer having a high fiber content rate has lower ductility and higher elasticity than those of a layer having a low fiber content rate. Therefore, by arranging the first layer, the second layer, and the third layer in this order so that the fiber content rate decreases, it is possible to obtain the correlation that the second layer is higher in ductility and lower in elasticity than the first layer and that the third layer is higher in ductility and lower in elasticity than the second layer.

Furthermore, the correlation that the second layer is higher in ductility and lower in elasticity than the first layer and that the third layer is higher in ductility and lower in elasticity than the second layer may be obtained by utilizing both the difference in binder resin $S_1$ and the difference in content of the reinforcing fibers $W_1$.

The first layer, the second layer, and the third layer may be laminated and integrated in any manner. However, usually, the first layer and the second layer are laminated and integrated by bonding the binder resin contained in the first layer and the binder resin contained in the second layer. Similarly, the second layer and the third layer are laminated and integrated by bonding the binder resin contained in the second layer and the binder resin contained in the third layer. As a result, the three layers are laminated and integrated as a whole.

The thickness of each of the first, second and third fiber-reinforced resin layers is not limited, and the first layer, the second layer, and the third layer may have the same thickness or different thicknesses. Specifically, these layers can each have a thickness of, for example, 0.01 μm or more and 5,000 μm or less, 0.1 μm or more and 1,000 μm or less, 1 μm or more and 500 μm or less, or 5 μm or more and 250 μm or less. A basis weight of each of the fiber-reinforced resin layers is not limited, and may be, for example, 0.1 g/m² or more and 100,000 g/m² or less.

The layer thickness of each of the fiber-reinforced resin layers can be measured by scanning electron microscope observation. More specifically, in a still image obtained by enlarging a cross section of the fiber-reinforced resin material in a stacking direction, thicknesses at 10 arbitrary positions are actually measured, and an average value thereof can be taken as the layer thickness.

Each of the fiber-reinforced resin layers may be formed in any manner. As shown in Examples which will be described later, the fiber-reinforced resin layer can be obtained by heating and pressurizing a stacked product in which resin sheets serving as binder resins are inserted between a plurality of fiber assembly layers (alternatively, a stacked product in which a plurality of fiber assembly layers are inserted between a plurality of resin sheet layers serving as binder resins) to impregnate the fiber assemblies with the binder resins. In this case, when the total amount of the binder resin constituting the resin sheet is impregnated into the fiber assembly, the reinforcing fibers $W_1$ and the binder resin $S_1$ are uniformly present in the fiber-reinforced resin layer. On the other hand, even after the binder resin constituting the resin sheet is sufficiently impregnated into the fiber assembly, the binder resin constituting the resin sheet may still be surplus. In this case, each of the fiber-reinforced resin layers includes a resin layer consisting only of a binder resin and a fibrous layer in which a fiber assembly is impregnated with the binder resin, the resin layer and the fibrous layer being alternately arranged. These layers are all fiber-reinforced resin layers in the present embodiment.

As described above, in the case of a fiber-reinforced resin layer in which a resin layer consisting only of a binder resin and a fibrous layer in which a fiber assembly is impregnated with the binder resin are alternately arranged, the thickness of the resin layer is preferably small. This is because the smaller the thickness of the resin layer, the higher the fiber content rate of the fiber-reinforced resin material as a whole, and mechanical characteristics are improved. From such a viewpoint, the resin layer preferably has a thickness of preferably 5,000 μm or less, and can be 0.1 μm or more and 2,000 μm or less, 0.2 μm or more and 500 μm or less, 0.3 μm or more and 250 μm or less, or 0.4 μm or more and 190 μm or less.

The thickness of the resin layer can be measured by scanning electron microscope observation. More specifically, in a still image obtained by enlarging a cross section of the fiber-reinforced resin material in a stacking direction, thicknesses at 10 arbitrary positions are actually measured, and an average value thereof can be taken as the layer thickness.

The number of the fiber-reinforced resin layers in the present fiber-reinforced resin material is not limited, and can be, for example, 2 layers or more and 100,000 layers or less, 3 layers or more and 10,000 layers or less, 4 layers or more and 1,000 layers or less, or 5 layers or more and 100 layers or less.

The features that the second layer is higher in ductility and lower in elasticity than the first layer and that the third layer is higher in ductility and lower in elasticity than the second layer, in the present fiber-reinforced resin material, can be obtained by taking out or reproducing each layer, then performing a three-point bending test at the same load application rate using an autograph, and comparing the respective two layers in terms of elastic modulus and fracture strain at the time of break of a test piece.

A use mode of the present fiber-reinforced resin material is not limited, and, for example, either the first layer side (relatively low ductility and high elasticity side) or the third layer side (high ductility and low elasticity side) may be used as an impact input side. Of these sides, the first layer side is preferably used as the impact input side. In this case, dramatically higher mechanical characteristics can be exhibited as compared with the case where the third layer side is used as the impact input side. In particular, remarkable bending stress can be obtained. Specifically, it is possible to improve the bending stress when the first layer side is used as the impact input side by 120% or more (further 130% or more and 300% or less, or further 150% or more and 250% or less) relative to the bending stress when the third layer side is used as the impact input side.

[2] Method for Manufacturing Fiber-Reinforced Resin Material

The fiber-reinforced resin material 1 described above may be manufactured in any manner, but can be manufactured by a method including a stacking step and a hot-pressing step.

Of these steps, the stacking step is a step of stacking a sheet-shaped product of continuous fibers that serves as a fiber assembly and a resin sheet that serves as a binder resin (a first thermoplastic resin, a second thermoplastic resin, or a third thermoplastic resin) so as to obtain a laminated structure (see FIGS. 2 to 5).

The hot-pressing step is a step of heating and compressing the stacked product obtained through the stacking step in a stacking direction (see FIGS. 2 to 5).

The "sheet-shaped product (W)" is a sheet-shaped product that serves as a fiber assembly, and is obtained by assembling the continuous fibers $W_1$ in a sheet shape. The continuous fibers $W_1$ are as described above, and are substantially unchanged before and after the fiber-reinforced resin material is formed. In the sheet-shaped product W, the continuous fibers $W_1$ may be assembled in any manner. That is, for example, the continuous fibers $W_1$ may be assembled by being aligned, may be woven and assembled like a woven fabric, may be knitted and assembled like a knitted fabric, or may be assembled without being woven like a nonwoven fabric. The sheet-shaped product W may consist only of one continuous fiber layer in which the continuous fibers $W_1$ are arranged in layers, or may be composed of two or more continuous fiber layers.

The "resin sheet (S)" is a sheet-shaped product containing the binder resin $S_1$. The thermoplastic resin constituting the resin sheet S is as described above, and is substantially unchanged before and after the fiber-reinforced resin material 1 is formed.

In the stacking step, the sheet-shaped product W and the resin sheet S only need be stacked so as to obtain a target laminated structure. However, at the time of stacking, they may be stacked so as to obtain the target laminated structure by one hot-pressing step, but may be stacked so as to obtain the target laminated structure through two or more hot-pressing steps. That is, for example, it is also possible to separately form a laminate that serves as the first layer (see FIG. 2), a laminate that serves as the second layer (see FIG. 3), and a laminate that serves as the third layer (see FIG. 4), further stack the obtained laminates (see FIG. 5), and then heat and compress the stacked laminates to thereby obtain a target fiber-reinforced resin material. That is, the sheets can be finally integrated through such separate stacking to obtain the fiber-reinforced resin material.

In addition, at the time of each stacking, an adhesive or the like for adhering the sheets so that the sheets are not separated from each other before the hot-pressing step may be interposed or need not be interposed.

In addition, a heating temperature and a pressurizing pressure to be applied in the thermocompression step are not limited, and can be set within appropriate ranges depending on the type of the thermoplastic resin to be used. For example, when the polyamide is selected as the particles and the composite resin and polyamide described above are selected as the binder resin, the heating temperature can be 140° C. or more and 270° C. or less, 160° C. or more and 260° C. or less, and 180° C. or more and 250° C. or less. The pressurizing pressure can be more than 0 MPa and 9.81 MPa or less, more than 0 MPa and 9.0 MPa or less, and more than 0 MPa and 7.0 MPa or less.

In addition, when a plurality of thermocompression steps are imposed in obtaining one fiber-reinforced resin material, the heating temperature and the pressurizing pressure in each step may be the same or different.

[3] Fiber-Reinforced Resin Article

The fiber-reinforced resin article of the present embodiment is made of the fiber-reinforced resin material described above. This fiber-reinforced resin article can also be referred to as a fiber-reinforced resin molded body.

An application of this fiber-reinforced resin article is not particularly limited, and the fiber-reinforced resin article can be used as, for example, exterior materials, interior materials, structural materials (body shell, vehicle body, and aircraft body), and impact absorbing materials for automobiles, railway vehicles, ships, airplanes, and the like. Among them, examples of automobile supplies include exterior materials for automobiles, interior materials for automobiles, structural materials for automobiles, shock absorbers for automobiles, and components in engine rooms.

Specific examples of the automobile supplies include a bumper, a spoiler, a cowling, a front grille, a garnish, a hood, a cargo room lid, a cowl louver, a fender panel, a rocker molding, a door panel, a roof panel, an instrument panel, a center cluster, a door trim, a quarter trim, a roof lining, a pillar garnish, a deck trim, a tonneau board, a package tray, a dashboard, a console box, a kicking plate, a switch base, a seat back board, a seat frame, an arm rest, a sun visor, an intake manifold, energy absorbers such as an engine head cover, an engine under cover, an oil filter housing, a housing for on-vehicle electronic component (ECU, TV monitor, etc.), an air filter box, and a rush box, and body shell constituent parts such as a front end module.

Further, examples of the application of the fiber-reinforced resin article include interior materials, exterior materials, and structural materials for buildings or furniture. That is, the product can be a door covering material, a door structural material, a covering material of various types of furniture (desk, chair, shelf, chest of drawers, etc.), or a structural material, and further, a modular bath, a septic tank, or the like. In addition, the fiber-reinforced resin article can be used as a packaging body, an accommodating body (tray etc.), a protecting member, a partition member, and the like. Further, the fiber-reinforced resin article can be a molded body such as housings and articles for household electric appliances (slim-type TV, refrigerator, washing machine, vacuum cleaner, mobile phone, portable game machine, note type personal computer, etc.).

EXAMPLES

Hereinafter, the present invention will be specifically described by way of examples.
[1] Materials Used
(1-1) Sheet-shaped Product W (PA6 Particles Attached)
As the continuous fibers $W_1$, carbon fibers to which particles $W_{12}$ (PA6 particles) were attached were used. As base carbon fibers $W_{11}$, the product name "HTS 40" (24K) manufactured by Toho Tenax Co., Ltd. was used. A sizing material on surfaces of the base carbon fibers was removed, and then the base carbon fibers were immersed in a colloidal liquid which will be described below, and electrophoresis was performed at 30 V for 30 seconds to obtain a sheet-shaped product W of the continuous fibers $W_1$ in which PA6 particles were attached to about 30 to 100 area % of the surfaces of the base carbon fibers.

Colloidal liquid: a liquid containing 750 mg of PA6 particles (average particle diameter: 12 μm), 75 g of water, 400 mg of a surfactant (sodium dodecyl sulfate, SDS), and 50 mg of potassium chloride.
(1-2) Resin Sheet S ($S_{PA6}$) Using PA6
Resin sheet: a sheet obtained by molding PA6 (product name: "CM1001" manufactured by Toray Industries, Inc.) pellets into a thickness of 70 to 110 μm by hot pressing.

PA6 corresponds to a polyamide resin as the thermoplastic resin B.
(1-3) Resin Sheet S ($S_A$) Using Composite Resin A
Composite resin A: a composite resin of PP, PA11, and a compatibilizer, having a PP parent phase (manufactured by TOYOTA BOSHOKU CORPORATION), specifically, a composite resin obtained by melt-kneading polypropylene (homopolymer having a weight average molecular weight of 320,000), PA11 (manufactured by Arkema, product name "Rilsan BMN O", weight average molecular weight: 18,000), and a compatibilizer (maleic anhydride-modified ethylene-butene copolymer, manufactured by Mitsui Chemicals, Inc., product name "TAFMER MH7020") at a mass ratio of 55%:25%:20% (melt-kneaded product of a melt-kneaded product of PA11 and the compatibilizer, and PP).

Resin sheet $S_A$: a sheet obtained by molding the composite resin A into a thickness of 160 μm.

PP corresponds to a polyolefin resin as the thermoplastic resin A, and PA11 corresponds to a polyamide resin as the thermoplastic resin B.

(1-4) Resin Sheet S ($S_C$) Using Composite Resin C
Composite resin C: a composite resin of PP, PA6, and a compatibilizer, having a PA parent phase (manufactured by TOYOTA BOSHOKU CORPORATION), specifically, a composite resin obtained by melt-kneading polypropylene (homopolymer having a weight average molecular weight of 520,000), PA6 (weight average molecular weight: 18,000), and a compatibilizer (maleic anhydride-modified ethylene-butene copolymer, manufactured by Mitsui Chemicals, Inc., product name "TAFMER MH7020") at a mass ratio of 10%:60%:30% (melt-kneaded product of a melt-kneaded product of PA6 and the compatibilizer, and PP).

Resin sheet $S_C$: a sheet obtained by molding the composite resin C into a thickness of 160 μm.

Figure 2:
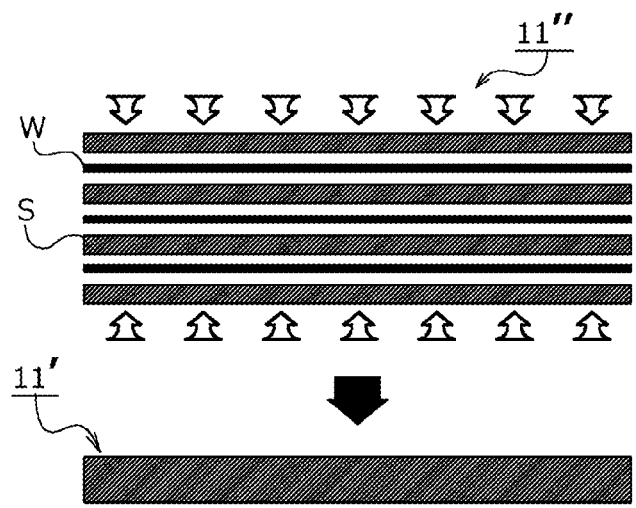
FIG. 2 is an explanatory view for partially explaining an example of a method for manufacturing a fiber-reinforced resin material.

PP corresponds to a polyolefin resin as the thermoplastic resin A, and PA6 corresponds to a polyamide resin as the thermoplastic resin B.
[2] Preparation of Fiber-Reinforced Resin Material
(2-1) Experimental Example 1: Fiber-Reinforced Resin Material Having Laminated Structure $T_1$ As shown in FIG. 2, a stacked product 11" in which three sheet-shaped products W were interposed between four resin sheet S ($S_{PA6}$) layers was formed, and this stacked product 11" was heated and pressurized under the conditions of a temperature of 230° C. and a pressure of 0.3 to 5.0 MPa to obtain a first layer laminate 11' serving as the first layer 11.

Figure 3:
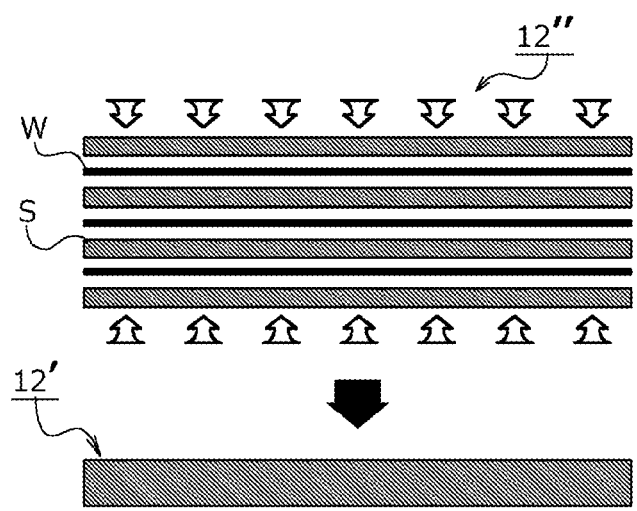
FIG. 3 is an explanatory view for partially explaining an example of a method for manufacturing a fiber-reinforced resin material.

Similarly, as shown in FIG. 3, a stacked product 12" in which three sheet-shaped products W were interposed between four resin sheet S ($S_C$) layers was formed, and this stacked product 12" was heated and pressurized under the conditions of a temperature of 230° C. and a pressure of 0.3 to 5.0 MPa to obtain a second layer laminate 12' serving as the second layer 12.

Figure 4:
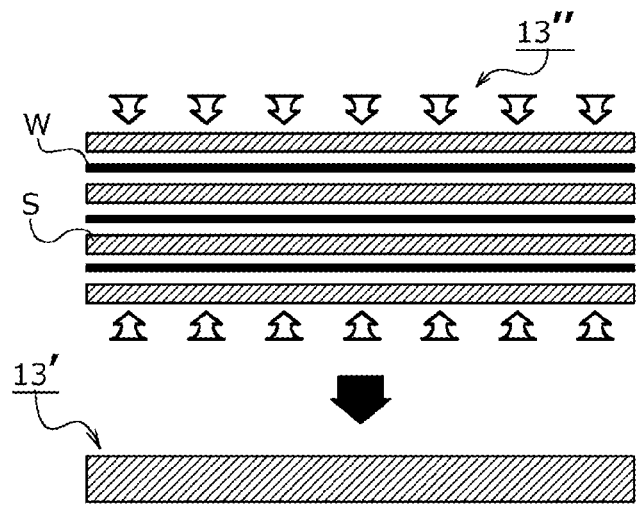
FIG. 4 is an explanatory view for partially explaining an example of a method for manufacturing a fiber-reinforced resin material.

Similarly, as shown in FIG. 4, a stacked product 13" in which three sheet-shaped products W were interposed between four resin sheet S ($S_A$) layers was formed, and this stacked product 13" was heated and pressurized under the conditions of a temperature of 230° C. and a pressure of 0.3 to 5.0 MPa to obtain a third layer laminate 13' serving as the third layer 13.

Figure 5:
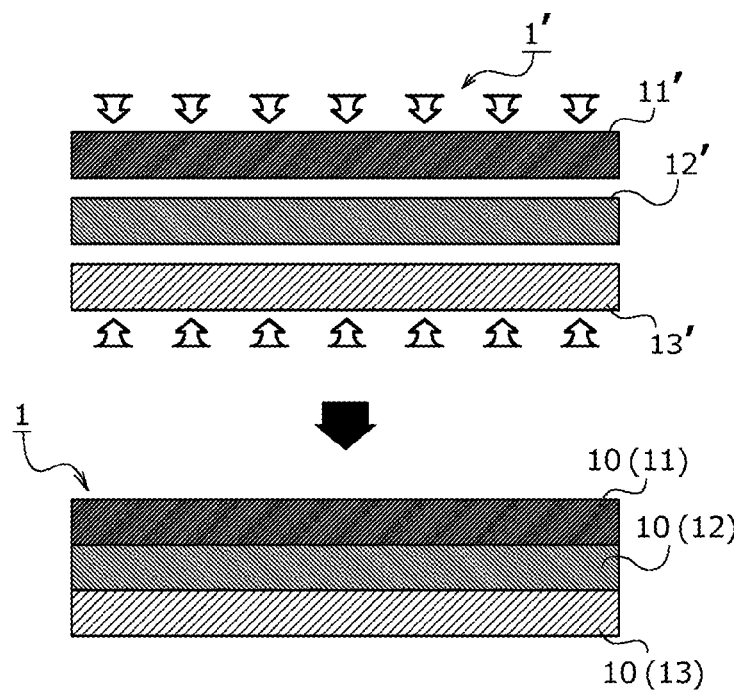
FIG. 5 is an explanatory view for partially explaining an example of a method for manufacturing a fiber-reinforced resin material.

Thereafter, as shown in FIG. 5, a stacked product 1' was formed by stacking the first layer laminate 11', the second layer laminate 12', and the third layer laminate 13' in this order. The stacked product 1' was heated and pressurized under conditions of a temperature of 230° C. and a pressure of 0.3 to 5.0 MPa to obtain a fiber-reinforced resin material 1 (see FIG. 1) having a laminated structure $T_1$ (having the first layer on the impact input side) in which the first layer, the second layer, and the third layer were laminated in this order, as Experimental Example 1.

When the first layer laminate 11' serving as the first layer 11, the second layer laminate 12' serving as the second layer 12, and the third layer laminate 13' serving as the third layer 13 are compared with each other, the second layer 12 has higher ductility and lower elasticity than those of the first layer 11, and the third layer has higher ductility and lower elasticity than those of the second layer.

This is due to the fact that, when PA6 which is a thermoplastic resin forming the resin sheet $S_{PA6}$, the composite resin C which is a thermoplastic resin forming the resin sheet $S_C$, and the composite resin A which is a thermoplastic resin forming the resin sheet $S_A$ are compared with each other, the composite resin C has higher ductility and lower elasticity than those of PA6, and composite resin A has higher ductility and lower elasticity than those of the composite resin C.

That is, the properties of each thermoplastic resin are as follows.

PA6: tensile elongation at break: 35%, and bending elastic modulus: 2,800 MPa

Composite resin C: tensile elongation at break: 257%, and bending elastic modulus: 1,088 MPa Composite resin A: tensile elongation at break: 310%, and bending elastic modulus: 850 MPa Among the above values, the tensile elongation at break is measured in accordance with ISO527-1 (ISO multipurpose test piece, tensile speed: 50 mm/min). The bending elastic modulus is measured similarly as in a three-point bending test in [3] (3-1) which will be described later.

Figure 7:
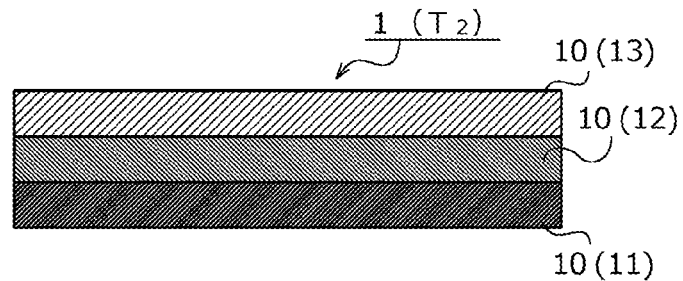
FIG. 7 is an explanatory view for explaining another example of the fiber-reinforced resin material.

(2-2) Experimental Example 2: Fiber-Reinforced Resin Material Having Laminated Structure $T_2$ The front and back of the fiber-reinforced resin material 1 of Experimental Example 1 having the laminated structure $T_1$ in the above (2-1) were reversed to obtain, as Experimental Example 2, a fiber-reinforced resin material 1 (see FIG. 7) having a laminated structure $T_2$ (having the third layer on the impact input side) in which the third layer, the second layer, and the first layer were laminated in this order.

(2-3) Experimental Example 3: Fiber-Reinforced Resin Material Having Laminated Structure $T_3$ As shown in FIG. 10(a), a stacked product 15" in which five sheet-shaped products W were interposed between six resin sheet S ($S_{PA6}$) layers was formed, and this stacked product 15" was heated and pressurized under the conditions of a temperature of 230° C. and a pressure of 0.3 to 5.0 MPa to obtain an upper layer laminate 15' serving as an upper layer 15.

Figure 10:
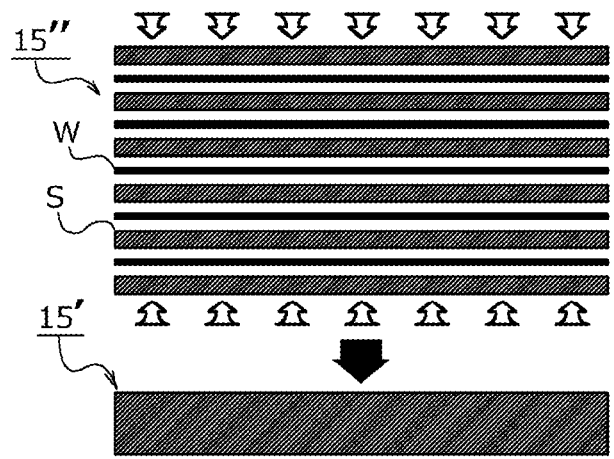
FIGS. 10(a), 10(b), and 10(c) are explanatory views for explaining another example of the method for manufacturing a fiber-reinforced resin material.
Figure 10:
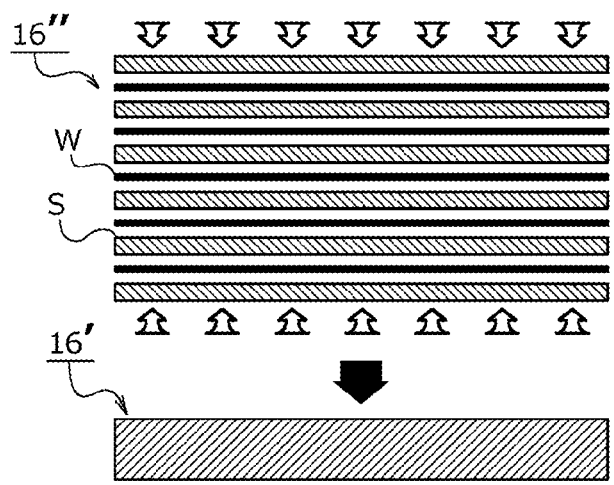
Figure 10:
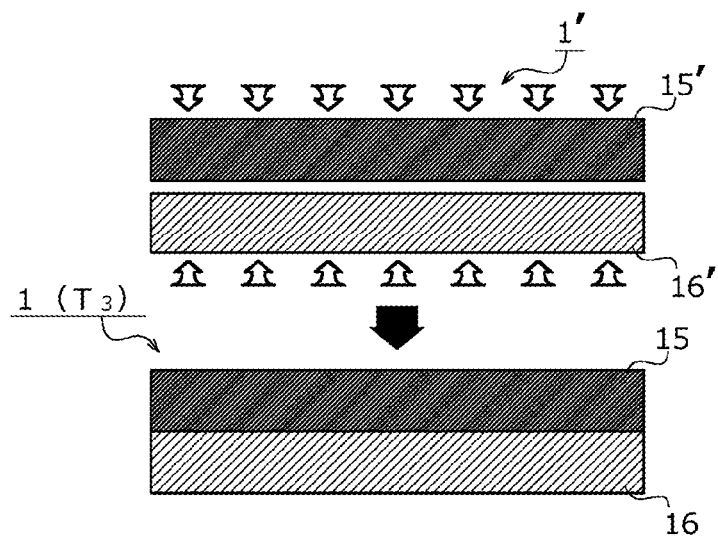

Similarly, as shown in FIG. 10(b), a stacked product 16" in which three sheet-shaped products W were interposed between six resin sheet S ($S_C$) layers was formed, and this stacked product 16" was heated and pressurized under the conditions of a temperature of 230° C. and a pressure of 0.3 to 5.0 MPa to obtain a lower layer laminate 16' serving as a lower layer 16.

Figure 8:
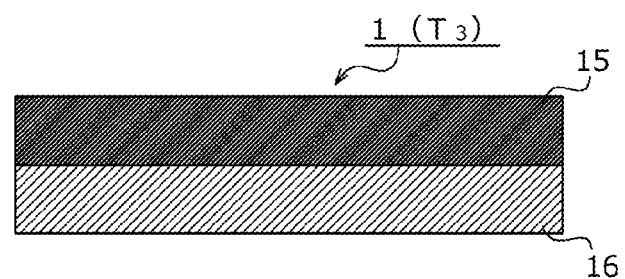
FIG. 8 is an explanatory view for explaining another example of the fiber-reinforced resin material.

Thereafter, as shown in FIG. 10(c), a stacked product 1' was formed by stacking the upper layer laminate 15' and the lower layer laminate 16' in this order. The stacked product 1' was heated and pressurized under conditions of a temperature of 230° C. and a pressure of 0.3 to 5.0 MPa to obtain, as Experimental Example 3, a fiber-reinforced resin material 1 (see FIG. 8) having a laminated structure $T_3$ (having the upper layer on the impact input side) in which the upper layer and the lower layer were laminated in this order.

Figure 9:
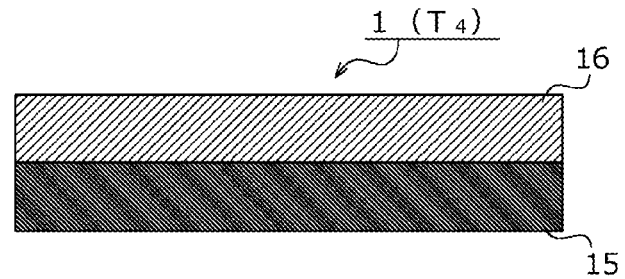
FIG. 9 is an explanatory view for explaining another example of the fiber-reinforced resin material.

(2-4) Experimental Example 4: Fiber-Reinforced Resin Material Having Laminated Structure $T_4$ The front and back of the fiber-reinforced resin material 1 (see FIG. 8) of Experimental Example 3 having the laminated structure $T_3$ in the above (2-3) were reversed to obtain, as Experimental Example 4, a fiber-reinforced resin material 1 (see FIG. 9) having a laminated structure $T_4$ (having the lower layer on the impact input side) in which the lower layer and the upper layer were laminated in this order.

TABLE 1

| | Structure | Fiber Content rate Vf (%) | Bending stress (MPa) | Bending elastic modulus (GPa) | Fracture strain (mm %) |
|---|---|---|---|---|---|
| Experimental Example 1 | $T_1$ | 34.5 | 561 | 40.4 | 5.73 |
| Experimental Example 2 | $T_2$ | 34.0 | 355 | 47.0 | 1.85 |
| Experimental Example 3 | $T_3$ | 36.0 | 546 | 46.3 | 4.33 |
| Experimental Example 4 | $T_4$ | 36.0 | 258 | 44.6 | 2.90 |

[3] Evaluation (3-1) Three-Point Bending Test

In accordance with JIS K7074, in each of Experimental Examples 1 to 4, two test pieces (width: 12 mm, thickness: 2.4 mm, and length: 100 mm) were used, and a load was applied from the upper side (for example, the first layer 11 side in the structure $T_1$) of each structure at a distance between support points of 80 mm and a bending speed of 5 mm/min to conduct a three-point bending test, thereby measuring the bending stress, the bending elastic modulus, and the strain. The results are shown in Table 1 as average values of the measured values obtained using the two test pieces.

(3-2) Stress-Strain Curve

A test piece of each of Experimental Examples 1 to 4 (width: 12 mm, thickness: 2.4 mm, and length: 100 mm) was used and attached to an autograph (Model "AGS-X", manufactured by Shimadzu Corporation), and a load was applied from the upper side (for example, the first layer 11 side in the structure $T_1$) of each structure at a distance between support points of 80 mm and a bending speed of 5 mm/min to conduct a three-point bending test, thereby obtaining a stress-strain curve. The obtained stress-strain curves are shown in a multiple chart in FIG. 11.

(3-3) Observation of Broken Site

An image in which the vicinity of the broken portion of the test piece of Experimental Example 1 was enlarged 50 times was acquired using a digital microscope (Model: "KH-8700", manufactured by HIROX Corporation) and is shown in FIG. 12.

Figure 11:
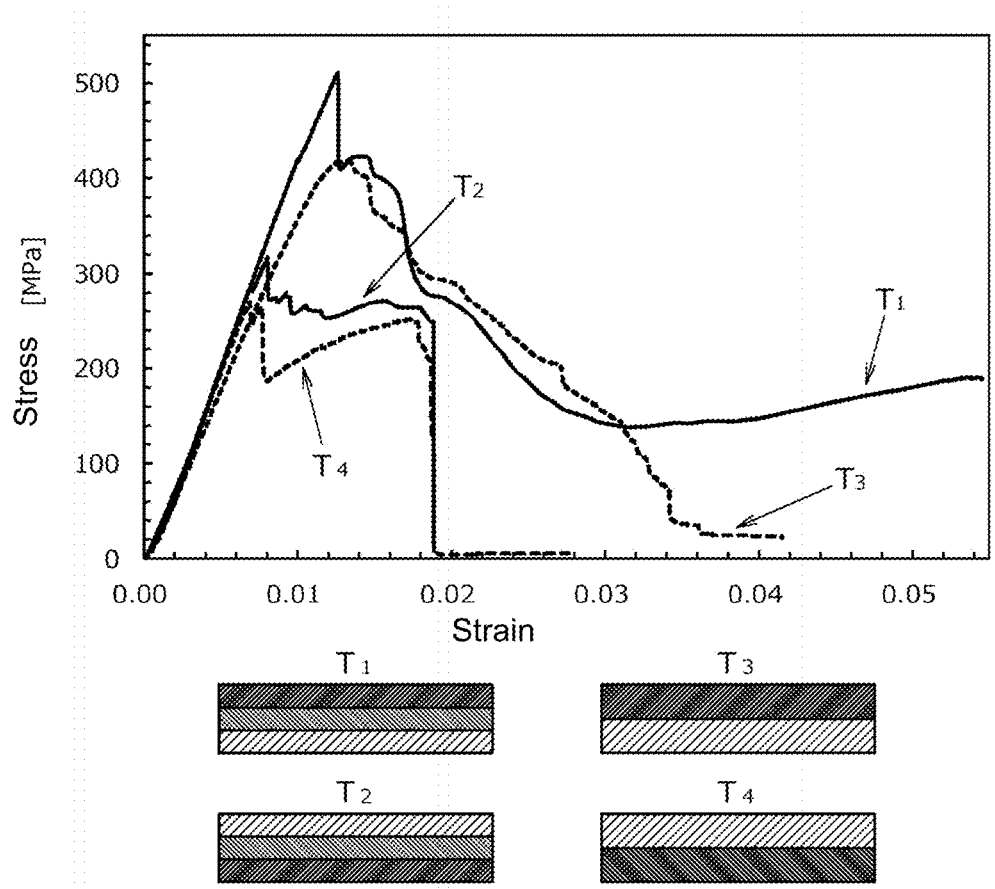
FIG. 11 is a multiple chart showing stress-strain curves by various fiber-reinforced resin materials.
Figure 12:
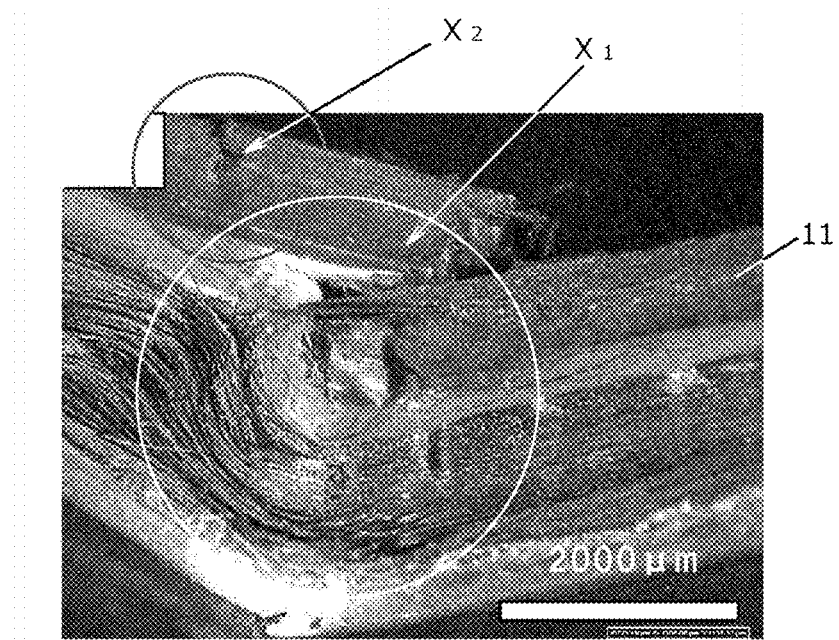
FIG. 12 is an enlarged explanatory view showing vicinity of a broken portion of a test piece of Experimental Example 1.

From the results of Table 1, FIG. 11, and FIG. 12, it can be seen that, in Experimental Example 2 (structure $T_2$) and Experimental Example 4 (structure $T_4$), break occurs after arrival at the maximum stress. On the other hand, in Experimental Example 1 (structure $T_1$) and Experimental Example 3 (structure $T_3$), the stress is maintained while the strain is increased, after arrival at the maximum stress. In particular, in Experimental Example 1 (structure $T_1$), it can be seen that a stress of about 130 to 180 MPa can be maintained while the strain is increased. Although the reason why the stress can be maintained while the strain is increased in this manner is not clear, it is confirmed, from FIG. 12, that, although the first layer 11 (PA6 as the binder resin) is broken at $X_2$, separation does not occur at an interface between the first layer 11 (PA6 as the binder resin is) and the second layer (the composite resin C as the binder resin). That is, it is considered that PA6 and the composite resin C are common as the thermoplastic resin B, and thus that the above-described separation is prevented due to a high content proportion thereof in the composite resin C. In addition, in order not to cause the separation, it can be considered that the first layer 11 is displaced in the stacking direction after break as indicated by $X_1$, and, as a result, that the load point is moved. It is also considered that, due to these actions, in Experimental Example 1, a phenomenon in which the stress continues to rise for a long time even after arrival at the maximum stress. This phenomenon is an event confirmed in all the test pieces employed.

The above-mentioned examples are for illustrative purposes only and are not to be construed as limiting the invention. While the invention has been described by way of examples of typical embodiments, it is understood that the language used in the description and illustration of the present invention is to be regarded as explanatory and illustrative and not restrictive. Modifications within the scope of the appended claims are possible without departing from the scope or spirit of the invention in its form as detailed herein. Although reference has been made herein to specific structures, materials and examples in the detailed description of the present invention, it is not intended to limit the invention to the disclosure set forth herein, but rather, to cover all functionally equivalent structures, methods, and uses within the scope of appended claims.

What is claimed is:

1. A fiber-reinforced resin material, comprising:
a first fiber-reinforced resin layer;
a second fiber-reinforced resin layer having higher ductility and lower elasticity than those of the first fiber-reinforced resin layer; and
a third fiber-reinforced resin layer having higher ductility and lower elasticity than those of the second fiber-reinforced resin layer,
wherein the first fiber-reinforced resin layer, the second fiber-reinforced resin layer, and the third fiber-reinforced resin layer are laminated and integrated in this order,
the first fiber-reinforced resin layer comprises a first thermoplastic resin and continuous fibers,
the second fiber-reinforced resin layer comprises a second thermoplastic resin and continuous fibers,
the third fiber-reinforced resin layer comprises a third thermoplastic resin and continuous fibers,
the first thermoplastic resin, the second thermoplastic resin, and the third thermoplastic resin are three kinds of thermoplastic resins different from each other,
the first thermoplastic resin is a polyamide resin,
the second thermoplastic resin is a composite resin of a polyolefin resin and a polyamide resin,
the third thermoplastic resin is a composite resin of a polyolefin resin and a polyamide resin,
all of the continuous fibers have particles attached to surfaces thereof, and
the particles are made of a polyamide resin.

2. The fiber-reinforced resin material according to claim 1, wherein the first fiber-reinforced resin layer, the second fiber-reinforced resin layer, and the third fiber-reinforced resin layer have different fiber content rates.

3. The fiber-reinforced resin material according to claim 1, wherein
the second thermoplastic resin and the third thermoplastic resin have different blending ratios of the polyolefin resin and the polyamide resin.

4. The fiber-reinforced resin material according to claim 3, wherein
a proportion of polyamide resin in the second thermoplastic resin is greater than a proportion of polyamide resin in the third thermoplastic resin, and
a proportion of polyolefin resin in the second thermoplastic resin is smaller than a proportion of polyolefin resin in the third thermoplastic resin.

5. The fiber-reinforced resin material according to claim 3, wherein
a mass ratio of the polyolefin resin and the polyamide resin in the second thermoplastic resin is different from a mass ratio of the polyolefin resin and the polyamide resin in the third thermoplastic resin.

6. The fiber-reinforced resin material according to claim 1, wherein
a weight average molecular weight of the polyolefin resin in the second thermoplastic resin is different from a weight average molecular weight of the polyolefin resin in the third thermoplastic resin.

7. A fiber-reinforced resin article comprising the fiber-reinforced resin material according to claim 1.

8. A method for manufacturing the fiber-reinforced resin material according to claim 1, the method comprising:
stacking a sheet-shaped product obtained by forming the continuous fibers into a sheet shape and each resin sheet that serves as the first thermoplastic resin, the second thermoplastic resin, or the third thermoplastic resin so as to obtain a laminated structure in which the first fiber-reinforced resin layer, the second fiber-reinforced resin layer, and the third fiber-reinforced resin layer are laminated in this order; and
heating and compressing a stacked product obtained during the stacking in a stacking direction.

* * * * *